United States Patent [19]

Valkering

[11] Patent Number: 5,499,946
[45] Date of Patent: Mar. 19, 1996

[54] DEVICE FOR EXHAUSTING GAS OR THE LIKE

[75] Inventor: Jozef E. P. Valkering, Limmen, Netherlands

[73] Assignee: Euromate Industrial Air Cleaning Systems B.V., Alkmaar, Netherlands

[21] Appl. No.: 300,007

[22] Filed: Sep. 2, 1994

[30] Foreign Application Priority Data

Sep. 9, 1993 [NL] Netherlands ............ 9301563

[51] Int. Cl.⁶ .................................... B08B 15/04
[52] U.S. Cl. ......................................... 454/63
[58] Field of Search ........................... 454/63, 65

[56] References Cited

U.S. PATENT DOCUMENTS

| 3,753,443 | 8/1973 | Sorimachi et al. | 137/255 |
| 4,699,046 | 10/1987 | Bellieni | 454/65 |
| 4,846,660 | 7/1989 | Drossbach | 425/503 |
| 5,336,130 | 8/1994 | Ray | 454/65 |

FOREIGN PATENT DOCUMENTS

| 2392733 | 12/1978 | France . | |
| 2597703 | 10/1987 | France . | |
| 3004392 | 8/1981 | Germany | 454/65 |
| 4133757 | 4/1992 | Germany . | |

*Primary Examiner*—Harold Joyce
*Attorney, Agent, or Firm*—Panitch Schwarze Jacobs & Nadel

[57] ABSTRACT

A device for exhausting gas or the like, comprises a support and at least one exhaustion tube movably mounted to the support and having a frame which is connected to the support in a manner pivotable at least in vertical direction. The frame is provided with a balancing mechanism for the exhaustion tube, said balancing mechanism comprising a cable with a draw spring. The cable is guided between support and frame such that there are formed at least two cable portions to create two force components producing an opposite variable torque around the pivot point of the frame such that the balancing torques, counteracting the gravitational torque, are produced.

3 Claims, 3 Drawing Sheets

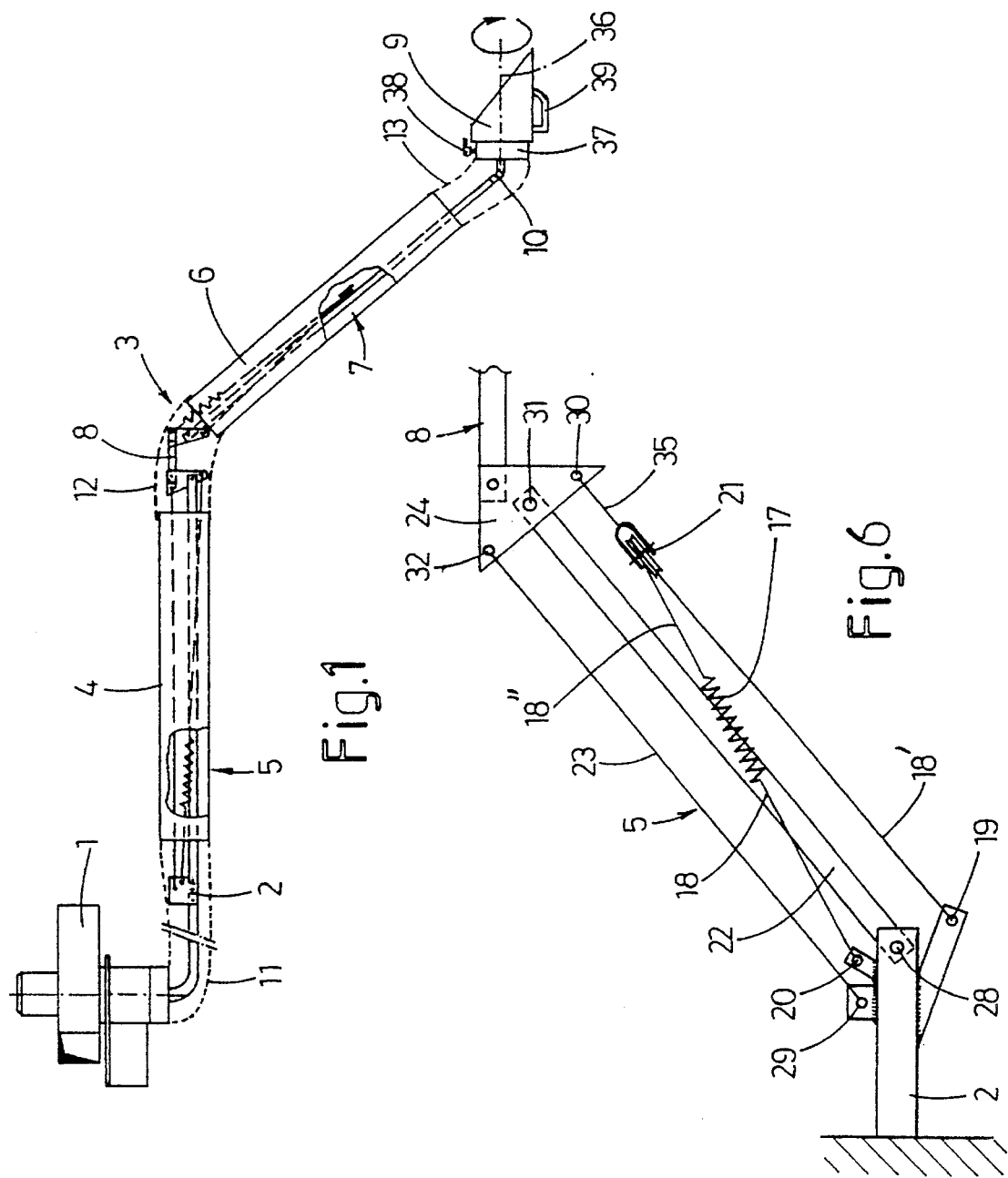

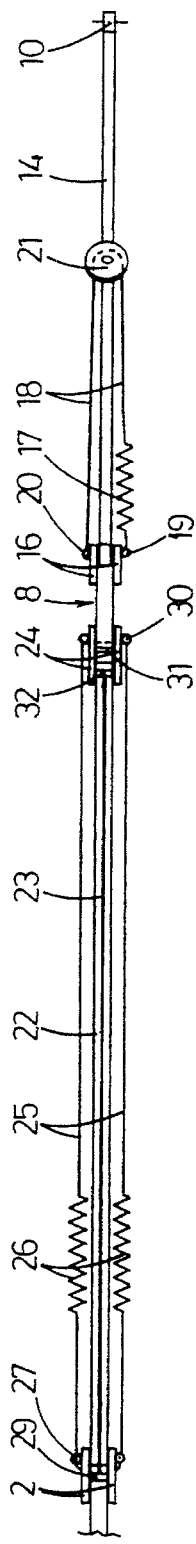
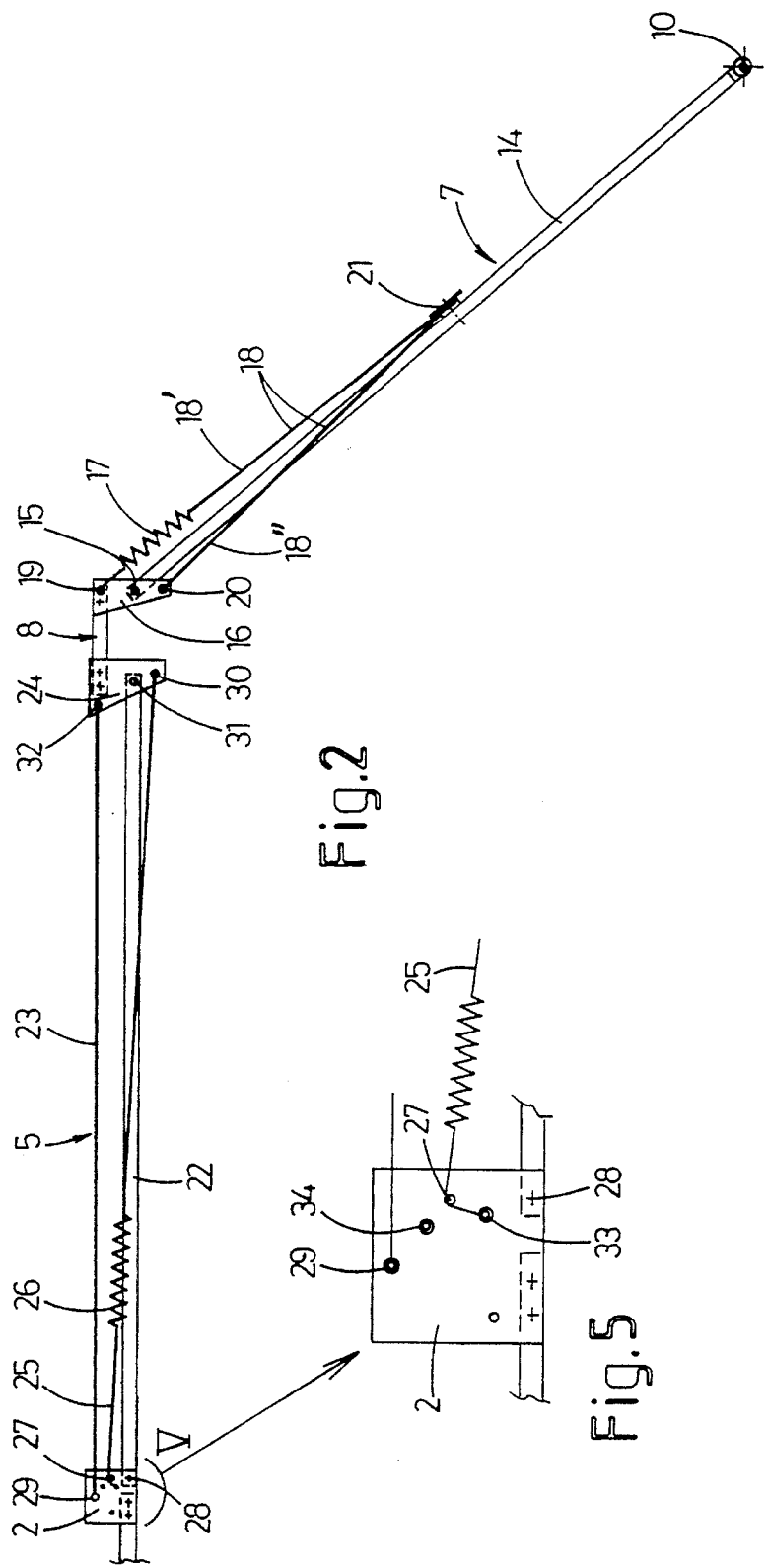
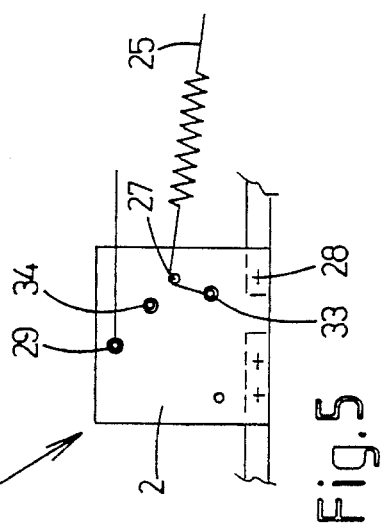

DEVICE FOR EXHAUSTING GAS OR THE LIKE

The invention relates to a device for exhausting gas or the like, comprising a support, at least one exhaustion tube movably mounted to the support and having a frame which is connected to the support in a manner pivotable at least in vertical direction and being provided with a balancing mechanism for the exhaustion tube, said balancing mechanism comprising a force producing means.

Such a device is well known, for example from WO 93/03867. In this device, the force producing means cooperates with a compensating means formed as a curve along which a cable connected to a draw spring runs, which engages the curve in different points when the exhaustion tube is in different positions. The configuration of the curve is adapted to the torque which is required for balancing the gravitational torque in certain positions of the exhaustion tube.

The object of the invention is to provide a device of the type mentioned in the preamble in which the balancing mechanism is constructed such that there is no need for a compensating means.

For this purpose the device according the invention is characterized in that the force producing means comprises at least two portions having two force components producing an opposite variable torque around the pivot point of the frame such that the balancing torques, counteracting the gravitational torque, are produced.

Due to the two opposite balancing torques produced in accordance with the invention, they can neutralize each other to such extent by a favourable construction of the frame that a balancing torque remains that balances the gravitational torque more or less.

The invention will hereafter be elucidated with reference to the drawing very schematically showing a plurality of embodiments of the invention by way of example.

FIG. 1 is side view, partially sectional, of a device for exhausting gas or the like according to the invention.

FIG. 2 is an enlarged side view of a portion of the inner parts of the device of FIG. 1.

FIG. 3 is a plan view of the subject of FIG. 2.

Figure 4A:
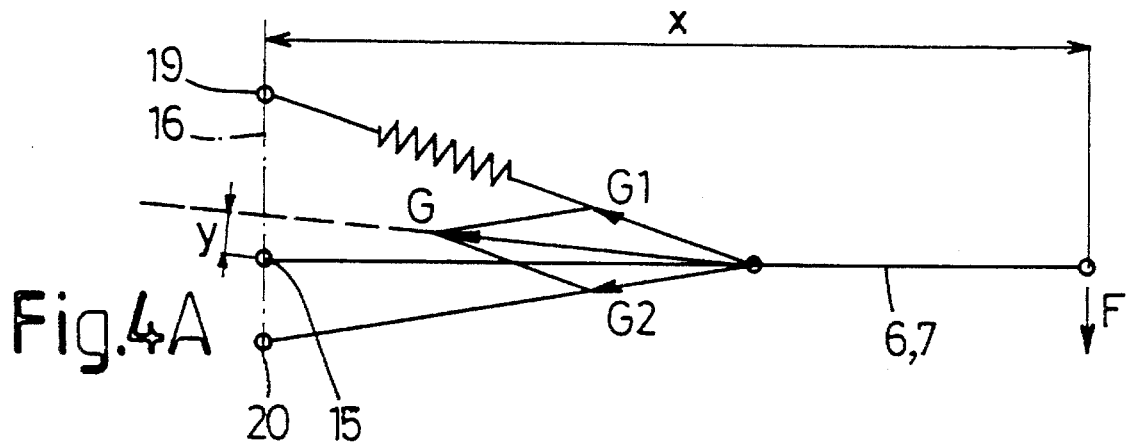

FIG. 4A en 4B are diagrams illustrating the interplay of forces in the second part of the device of FIG. 1 for balancing this part in two different positions.

FIG. 5 shows detail V of FIG. 2 on an enlarged scale.

FIG. 6 is an enlarged side view of an alternative embodiment of the left hand part of the device of FIG. 1.

FIG. 1 is a total view of the device for exhausting gas, or dust particles containing gas such as welding fumes, but also many other applications are conceivable. The device comprises an exhaustion or vacuum means, such as a fan 1, and a support 2 attached thereto. In the embodiment shown there is illustrated a stationary device in which the support 2 is fixed to the wall of a building or another stationary part. On the other hand, there may be a mobile embodiment in which the support 2 is positioned on an undercarriage which can be used in various places as long as the required connections are available.

The device further comprises an exhaustion tube 3 having a supporting frame determining the position of the exhaustion tube. In this embodiment there is used an articulated structure in the form of an arm having the support 2 as shoulder, a first tube part 4 having a frame 5 as upper arm, as second tube part 6 having a frame 7 as forearm connected to each other through an intermediate support 8 as elbow, and at the free end of the device an exhaust hood 9 connected to the frame 7 of the second tube part 6 through a pivot 10 as wrist. The tube parts 4 and 6 are in this case constructed as separate rigid parts fixed to supports of the frames 5 and 7 and sealingly connected to the fan 1, to each other, and to the exhaust hood, respectively, through accordion collars 11, 12, 13. Of course, it would also be possible, as is known perse, to construct the whole exhaustion tube as flexible hosing. In the present embodiment, the tube parts 4 and 6 are advantageously manufactured through the blow-moulding process offering the big advantage of very low investments for the required aluminium dies and the very low cost price of the product itself. Also the exhaust hood 9 might be manufactured in the blow-moulding process. It would of course also be possible to form the tube parts 4 and 6 from aluminium or steel sheets.

FIG. 2 and 3 show, on a larger scale, the carrier structure in the interior of the device. One can recognize the stationary support 2, the frame 5 of the first tube part 4, the intermediate support 8 and the frame 7 of the second tube part 6. This frame 7 consists of a rigid section tube 14 connected to support plates 16 of the intermediate support 8 in a manner pivotable in a vertical plane by means of a horizontal pivot 15.

To keep second tube part 6 in balance in any position, the frame 7 is equipped with a balancing mechanism, in this exemplary embodiment consisting of a draw spring 17 connected to a flexible cable 18 and in which the draw spring 17 together with the cable 18 being attached at both ends to fastening points 19, 20 on the Support plates 16 of the intermediate support 8 and being guided between their ends around a cable wheel 21 which is rotatably mounted on the section tube 14 such that there is formed a cable portion 18' and 18" running back and forth, respectively.

Figure 4B:
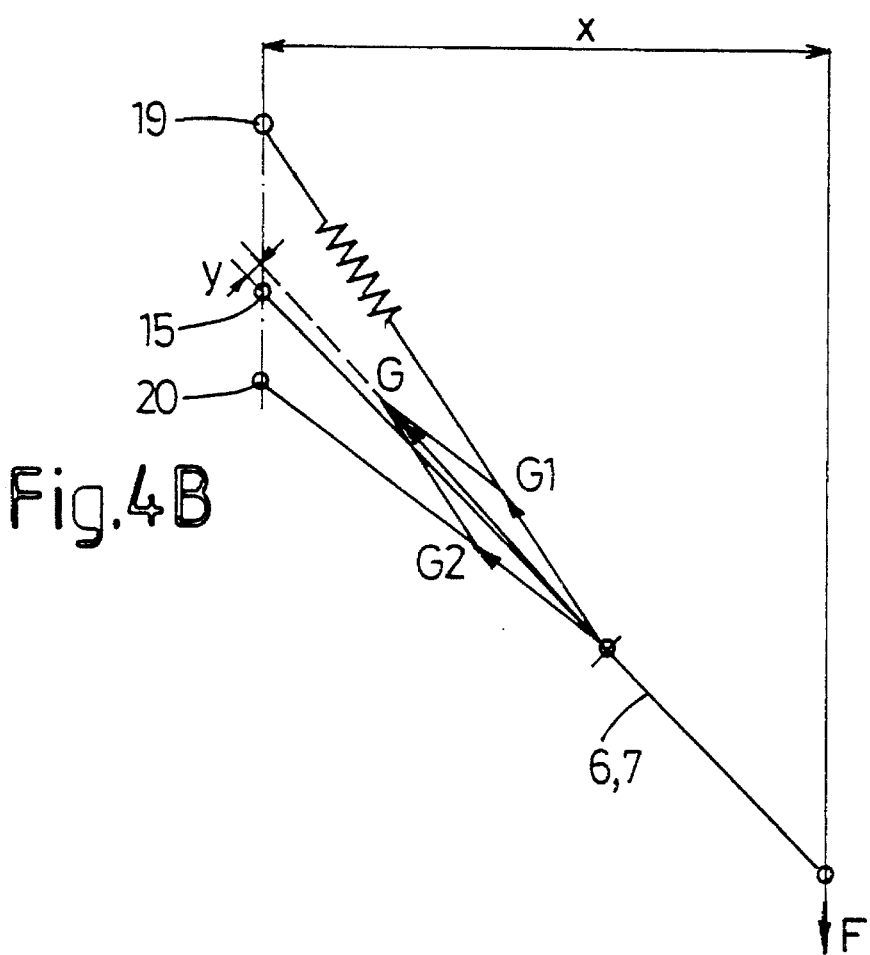

FIG. 4A and 4B show that the cable portions 18' and 18" together with the support plates 16 form, in side view, a deformable triangle of which the area is at a maximum in the horizontal position of the section tube 14. In this position the draw spring 17 is consequently tensioned to a maximum. As the distance from the upper fastening point 19 to the pivot 15 of the section tube 14 is larger than from the lower fastening point 20 to the pivot 15, the resultant G of the tensile forces G1 and G2 in both cable portions 18' and 18" passes above the pivot 15 so that this resultant G produces a torque with respect to the pivot 15 which is opposite to the torque resulting from the weight. There is a balance when F. x=G. y, in which F is the mass of the part of the device beyond the pivot 15, x the distance between the centre of gravity of this part and the pivot 15, G the resultant of the tension forces within the cable 18 and y the distance between the extension G and the pivot 15. This is clear from 4A and 4B. FIG. 4A and 4B further show that the distance y changes when the second tube part 6 is pivoted. Both the resultant G of the tension force within cable 18 and y are at a maximum in the horizontal position of the second tube part 6 in which also the torque of weight is at its maximum. When the second tube part 6 is pivoted upwardly or downwardly, both the torque of weight about the pivot 15 and the balancing torque decrease and with favourable dimensions and spring characteristics this balancing mechanism may cause more or less a balance in any position without requiring frictional forces within the pivot 15. This means that the adjustment of the second tube part 6 requires little force which facilitates the operation of the device. Preferably, the length of the cable 18 and/or of the draw spring 17 is adjustable to influence the balancing torque, for example to increase it if an accessory is mounted to the exhaust hood 9.

FIG. 2, 3 and 5 show that the frame 5 of the first tube part 4 consists of a parallelogram mechanism of which the sides are formed by a buckling resistant section tube 22, an equally long and parallel tension cable or tension rod 23, the support 2, and support plates 24 of the intermediate support 8. Due to this parallelogram mechanism of the frame 5, the angular position of the intermediate support 8 remains constant in all angular positions of the first tube part 4. The balancing mechanism in the first tube part 4 consists of a cable 25 having draw spring 26, said cable 25, on one end, engaging the support 2 at a support cam 27 in a position between the pivots 28 and 29 of the section tube 22 and tension rod 23. On the other end, the cable 25 is attached to the support plates 24 through a fastening point 30 in a position below the pivot 31, 32 of the section tube 22 and the tension rod 23. In this manner, the draw spring 26 counteracts a downward deformation of the parallelogram. As appears from FIG. 3, the cable 25 and draw spring 26 are of a double structure, but this is of course not necessary and depends on the structure of the whole frame 5. The cable 25 may end at the support cam 27, but in this exemplary embodiment the cable 25 runs over the support cam 27 downwardly to a fastening point 33. The support 2 is further provided with a second support cam or transition cam 34 to which the cable 25 abuts when the first tube part 4 together with the frame 5 are pivoted vertically upward and backwardly beyond it. This transition cam 34 leads to an additional tension of the draw spring 26 which is necessary to balance the device when the first tube part 4 pivots backwardly beyond the vertical position. Due to this transition cam 34 the adjusting range of the first tube part 4 can be extended considerably in upward direction which is a substantial advantage. It is noted that such a transition cam could also be provided on the intermediate support 8.

FIG. 6 shows an alternative embodiment of the frame 5 of the first tube part 4 in which the balancing mechanism of the second tube part 6 of the embodiment of FIG. 1–5 is more or less integrated in the frame 5. The draw spring 17, the cable 18, the upper fastening 19, the lower fastening point 20 and the cable wheel 21 can be recognized, in which the cable wheel 21 is now mounted pivotable to the fastening point 30 through a tie 45, such that the cable portion 18' of variable length is parallel to the long side of the parallelogram mechanism formed by the section tube 22 and the tension rod 23.

Returning to FIG. 1, there is shown a further aspect of the invention in relation to the exhaust hood 9. According to the invention, this exhaust hood is freely rotatable around the longitudinal axis 36. This may for example be realized as a result of the exhaust hood 9 being attached to a hood carrier 37 in a manner rotatable through 360°, for example as a result of an inner groove of one part engaging into an outer groove in the circumference of the other part. By accommodating any electrical facilities for the exhaust hood 9, such as illumination, within the hood carrier 37 instead of within the section hood 9, the rotatability of the exhaust hood 9 is not hindered by wiring between exhaust hood 9 and hood carrier 37. In FIG. 1 there is shown a switch 38, for example for the illumination, on the hood carrier 37. By means of a handle 39, for example, the exhaust hood 9 may be rotated in all positions so that in combination with the pivot 10 many different positions are attainable. This enables the exhaust hood 9 and the whole device to be adapted to different situations and conditions and there is no need for a parallelogram mechanism in the second tube part 6. Of course, such exhaust hood 9 may also be used in devices having differently constructed frames for the tube parts. Also the frames and the balancing mechanisms may be used separately or in various kinds of combinations.

The invention is not restricted to the embodiments shown in the drawing and described herein before, which may be varied in different manners within the scope of the invention. For example, instead of a mechanical draw spring as force producing means there may also be used a mechanical compression spring, a pneumatic spring or for example a dead weight. The cable may be replaced by a chain or another elongated flexible means.

I claim:

1. A device for exhausting gas-like fluids, comprising:

a support;

at least one exhaust tube movably mounted to the support and having a frame which is connected to the support in a manner pivotable at least in a vertical direction about a pivot point and being provided with a balancing mechanism for the at least one exhaust tube, said balancing mechanism comprising a force producing means, that includes at least two portions having two force components producing opposite variable torques around the pivot point of the frame such that balancing torques, counteracting torque caused by gravitation, are produced, the force producing means comprising a draw spring means and an elongated flexible fastening means connected thereto, said elongated flexible fastening means being guided around a reversing means fixed to the frame, and being mounted with its ends to the support to form cable portions, the flexible fastening means consists of a cable and the reversing means of a cable wheel.

2. A device according to claim 1, wherein the frame of the exhaustion tube is attached to the support by a singular pivot.

3. A device for exhausting gas-like fluids, comprising:

a support;

at least one exhaust tube movably mounted to the support and having a frame which is connected to the support in a manner pivotable at least in a vertical direction about a pivot point and being provided with a balancing mechanism for the at least one exhaust tube, said balancing mechanism comprising a force producing means, that includes at least two portions having two force components producing opposite variable torques around the pivot point of the frame such that balancing torques, counteracting torque caused by gravitation, are produced, the force producing means comprising a draw spring means and an elongated flexible fastening means connected thereto, said elongated flexible fastening means being guided around a reversing means fixed to the frame, and being mounted with its ends to the support to form cable portions, the flexible fastening means comprising a cable and the reversing means comprising a cable wheel.

\* \* \* \* \*